US010917702B2

(12) United States Patent
Archer, III et al.

(10) Patent No.: US 10,917,702 B2
(45) Date of Patent: Feb. 9, 2021

(54) CREATING CUSTOMIZED SHORT-FORM CONTENT FROM LONG-FORM CONTENT

(71) Applicant: AT&T Intellectual Property I, L.P., Atlanta, GA (US)

(72) Inventors: Virgil L. Archer, III, Los Angeles, CA (US); Mathew Goldade, Los Angeles, CA (US); Grant Hafer, Marina Del Rey, CA (US); Maxwell Shteir-Dunn, Orange, CA (US); Gowrishankar Subramaniam Natarajan, Torrance, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/219,317

(22) Filed: Dec. 13, 2018

(65) Prior Publication Data

US 2020/0196027 A1 Jun. 18, 2020

(51) Int. Cl.
*H04N 21/8549* (2011.01)
*G06F 16/483* (2019.01)
(Continued)

(52) U.S. Cl.
CPC ....... *H04N 21/8549* (2013.01); *G06F 16/483* (2019.01); *H04N 21/25* (2013.01);
(Continued)

(58) Field of Classification Search
None
See application file for complete search history.

(56) References Cited

U.S. PATENT DOCUMENTS

| 7,668,869 B2 | 2/2010 | Weinberger et al. |
| 8,238,718 B2 | 8/2012 | Toyama et al. |

(Continued)

FOREIGN PATENT DOCUMENTS

| WO | 2005003899 A2 | 1/2005 |
| WO | 2009040538 A1 | 4/2009 |

(Continued)

OTHER PUBLICATIONS

Zhang, Lei, Feng Wang, and Jiangchuan Liu. "Understand instant video clip sharing on mobile platforms: Twitter's vine as a case study." Proceedings of Network and Operating System Support on Digital Audio and Video Workshop, ACM, 2014. http://www.cs.sfu.ca/~jcliu/Papers/UnderstandInstantVideo.pdf.
(Continued)

*Primary Examiner* — Justin E Shepard

(57) ABSTRACT

In one example, a method includes extracting an excerpt from a first item of digital content. The first item of digital content is one of a plurality of items of digital content stored in a digital content library of a telecommunications service provider network. Topics that are trending among a plurality of users of the network are identified. A first topic of the topics in which a first user of the plurality of users has expressed an interest is identified. The excerpt is mapped to the first topic to generate a local mapping for the first user. The local mapping indicates a relationship between the first topic and the excerpt. A customized collection of excerpts is generated for the first user based on the local mapping. The first excerpt is included in the customized collection of excerpts. The customized collection of excerpts is sent to the first user.

20 Claims, 3 Drawing Sheets

(51) Int. Cl.
  *H04N 21/442* (2011.01)
  *H04N 21/25* (2011.01)
  *H04N 21/254* (2011.01)
  *H04N 21/262* (2011.01)
  *H04N 21/2543* (2011.01)
  *H04N 21/258* (2011.01)
  *H04N 21/44* (2011.01)
  *H04N 21/85* (2011.01)

(52) U.S. Cl.
  CPC ......... *H04N 21/251* (2013.01); *H04N 21/252* (2013.01); *H04N 21/254* (2013.01); *H04N 21/258* (2013.01); *H04N 21/25435* (2013.01); *H04N 21/25808* (2013.01); *H04N 21/25883* (2013.01); *H04N 21/25891* (2013.01); *H04N 21/262* (2013.01); *H04N 21/2625* (2013.01); *H04N 21/26258* (2013.01); *H04N 21/44* (2013.01); *H04N 21/44222* (2013.01); *H04N 21/85* (2013.01)

(56) References Cited

U.S. PATENT DOCUMENTS

| | | | |
|---|---|---|---|
| 8,914,452 B2 | 12/2014 | Boston et al. | |
| 8,948,812 B2 | 2/2015 | Dey et al. | |
| 9,002,175 B1 | 4/2015 | Raj | |
| 9,406,339 B2 | 8/2016 | Shore | |
| 9,570,107 B2 | 2/2017 | Boiman et al. | |
| 9,607,611 B2 | 3/2017 | Dayan et al. | |
| 9,721,165 B1 | 8/2017 | Bentley et al. | |
| 9,785,705 B1 | 10/2017 | Cartright et al. | |
| 9,865,308 B2 | 1/2018 | Gower et al. | |
| 9,870,797 B1 | 1/2018 | Tseytlin | |
| 9,965,129 B2 | 5/2018 | Reiley et al. | |
| 2008/0065611 A1* | 3/2008 | Hepworth | G06F 16/951 |
| 2014/0280017 A1* | 9/2014 | Indarapu | G06F 16/951 707/711 |
| 2015/0011311 A1* | 1/2015 | Relan | A63F 13/355 463/31 |
| 2016/0249116 A1 | 8/2016 | Harb | |
| 2016/0350665 A1 | 12/2016 | Andrews et al. | |
| 2016/0373817 A1 | 12/2016 | Drake et al. | |
| 2017/0228600 A1 | 8/2017 | Syed et al. | |
| 2017/0337273 A1* | 11/2017 | Iyer | G06F 16/9535 |
| 2018/0314952 A1* | 11/2018 | Kurian | G06N 20/00 |

FOREIGN PATENT DOCUMENTS

| | | |
|---|---|---|
| WO | 2016128984 A1 | 5/2016 |
| WO | 2016200692 A1 | 12/2016 |
| WO | 2018053257 A1 | 3/2018 |
| WO | 2018062795 A1 | 4/2018 |

OTHER PUBLICATIONS

Lei, Shaoshuai, Gang Xie, and Gaowei Yan. "A novel key-frame extraction approach for both video summary and video index." The Scientific World Journal 2014 (2014). https://europepmc.org/articles/pmc3976782.

Mei, Shaohui, et al. "Video summarization via minimum sparse reconstruction." Pattern Recognition 48.2 (2015): 522-533. http://or.nsfc.gov.cn/bitstream/00001903-5/342782/1/1000008700815.pdf.

Jiang, Wei, Courtenay Cotton, and Alexander C. Loui. "Automatic consumer video summarization by audio and visual analysis." Multimedia and Expo (ICME), 2011 IEEE International Conference on. IEEE, 2011. http://www.ee.columbia.edu/~wjiang/references/jiangicme11.pdf.

Zlatintsi, Athanasia, et al. "A saliency-based approach to audio event detection and summarization." Signal Processing Conference (EUSIPCO), 2012 Proceedings of the 20th European. IEEE, 2012. http://cvsp.cs.ntua.gr/publications/confr/ZlatintsiMaragos_MGC_EUSIPCO14_Lisbon_proc.pdf.

Kryscinski, Wojciech, et al. "Improving abstraction in text summarization." arXiv preprint arXiv:1808.07913 (2018). https://arxiv.org/pdf/1808.07913.pdf.

Sah, Shagan, et al. "Semantic text summarization of long videos." Applications of Computer Vision (WACV), 2017 IEEE Winter Conference on. IEEE, 2017. https://www.computer.org/csdl/proceedings/wacv/2017/4822/00/07926698.pdf.

* cited by examiner

CREATING CUSTOMIZED SHORT-FORM CONTENT FROM LONG-FORM CONTENT

The present disclosure relates generally to digital data distribution, and relates more particularly to methods, computer-readable media, and devices for creating short-form content or collections of excerpts from long-form content, where the short-form content is customized for a specific user based on the specific user's preferences.

BACKGROUND

As the number, variety, and sources of entertainment content (e.g., television programs, video clips, music, podcasts, books, advertisements, and the like) continue to increase, it may become more difficult for content consumers to identify content in which they may be interested. As such, providers of entertainment content may provide individual content consumers with content recommendations that are tailored to their interests.

SUMMARY

The present disclosure provides methods, computer-readable media, and devices for creating short-form content or collections of excerpts from long-form content, where the short-form content is customized for a specific user based on the specific user's preferences. In one example, a method includes extracting an excerpt from a first item of digital content. The first item of digital content is one of a plurality of items of digital content stored in a digital content library of a telecommunications service provider network. Topics that are trending among a plurality of users of the network are identified. A first topic of the topics in which a first user of the plurality of users has expressed an interest is identified. The excerpt is mapped to the first topic to generate a local mapping for the first user. The local mapping indicates a relationship between the first topic and the excerpt. A customized collection of excerpts is generated for the first user based on the local mapping. The first excerpt is included in the customized collection of excerpts. The customized collection of excerpts is sent to the first user.

In another example, a device includes a processor and a non-transitory computer-readable medium storing instructions which, when executed by the processor, cause the processor to perform operations. The operations include extracting an excerpt from a first item of digital content, wherein the first item of digital content is one of a plurality of items of digital content stored in a digital content library of a telecommunications service provider network, identifying a plurality of topics that are trending among a plurality of users of the telecommunications service provider network, identifying a first topic of the plurality of topics in which a first user of the plurality of users has expressed an interest, mapping the excerpt to the first topic to generate a local mapping for the first user, wherein the local mapping indicates a relationship between the first topic and the excerpt, generating a customized collection of excerpts for the first user based on the local mapping, wherein the first excerpt is included in the customized collection of excerpts, and sending the customized collection of excerpts to the first user.

In another example, a computer-readable medium stores instructions which, when executed by a processor of a user endpoint device, cause the processor to perform operations. The operations include extracting an excerpt from a first item of digital content, wherein the first item of digital content is one of a plurality of items of digital content stored in a digital content library of a telecommunications service provider network, identifying a plurality of topics that are trending among a plurality of users of the telecommunications service provider network, identifying a first topic of the plurality of topics in which a first user of the plurality of users has expressed an interest, mapping the excerpt to the first topic to generate a local mapping for the first user, wherein the local mapping indicates a relationship between the first topic and the excerpt, generating a customized collection of excerpts for the first user based on the local mapping, wherein the first excerpt is included in the customized collection of excerpts, and sending the customized collection of excerpts to the first user.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
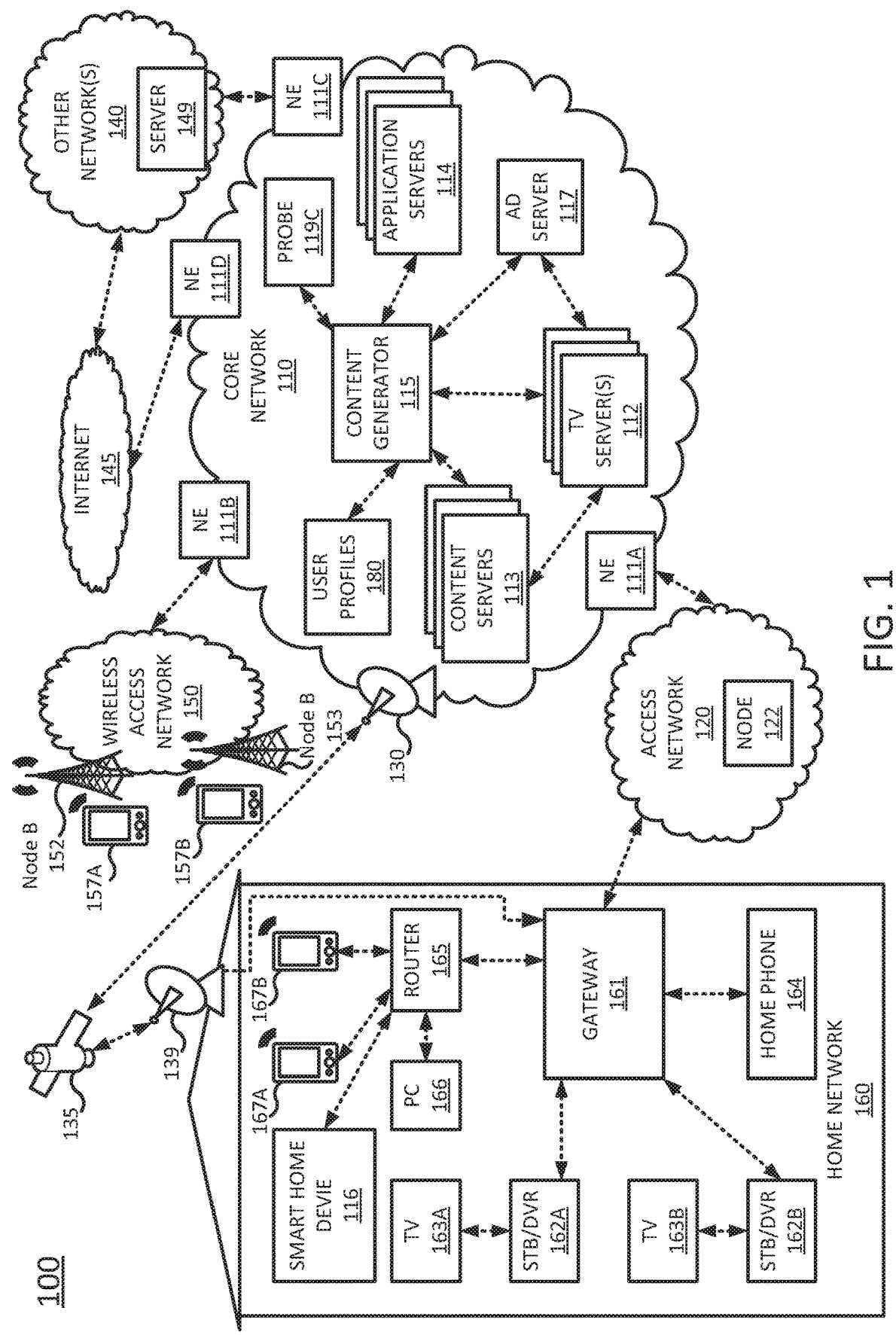
FIG. 1 illustrates an example network related to the present disclosure.

In one example, the present disclosure provides methods, computer-readable media, and devices for creating short-form content or collections of excerpts from long-form content, where the short-form content is customized for a specific user based on the specific user's preferences. As discussed above, providers of entertainment content may provide individual content consumers (herein also referred to as "users") with content recommendations that are tailored to their interests. In some cases, certain users or groups of users may be predisposed to consume not only particular genres of content, but also particular content formats. For instance, younger users tend to consume more content on their mobile devices than older users. When using their mobile devices, however, many users also tend to prefer relatively short-form content (e.g., content whose duration is shorter than a predefined period of time, such as ten minutes). However, a great deal of content is published in long form (e.g., in which the duration of the content is longer than the predefined period of time). For instance, movies, television shows, sports broadcasts, and other types of content may be considered too long by some users for consumption on a mobile device.

Examples of the present disclosure use available long-form content (e.g., media content whose duration is longer than a predefined period of time, such as ten minutes) to generate customized short-form content for specific users (where the duration of the short-form content may be shorter than the predefined period of time). That is, the customized short-form content contains one or more excerpts culled from one or more items of long-form content. For instance, the short-form content may be five minutes long and may contain a plurality of excerpts taken from an hour-long television episode. In one example, a specific user's interests are first identified, e.g., through analysis of the user's profile, social media feeds, and/or content consumption history. Subsequently, excerpts may be automatically generated from long-form content that matches the user's interests, short-form content may be automatically generated from one or more of the excerpts, and the short-form content may be delivered to the user.

Examples of the present disclosure may extract an excerpt from an item of media content taking any type of file format, where the excerpt is shorter than the entirety of the item of media content. For example, an excerpt generated from a video (e.g., a television show, a movie, and Internet video, a sports broadcast, or the like) may comprise a sequence of frames extracted from the video. Similarly, an excerpt generated from an audio file (e.g., a song, a podcast, and audible book, or the like) may comprise a sequence of audio frames extracted from the audio file. An excerpt generated from text (e.g., a book, a magazine, a newspaper, a web site, or the like) may comprise one or more phrases or sentences extracted from the text.

Although examples of the present disclosure may be discussed within the illustrative context of viewable content or media (e.g., television programs, movies, advertisements, and the like), it will be appreciated that the examples described herein could also be applied to other types of media. For instance, examples of the present disclosure could be implemented to generate customized short-form content from audible content or media (e.g., music, podcasts, audio books, and the like), printed content or media (e.g., books, magazines, newspapers, and the like), and other types of content.

To better understand the present disclosure, FIG. 1 illustrates an example network 100, related to the present disclosure. The network 100 may comprise part of a telecommunications service provider network. As shown in FIG. 1, the network 100 connects mobile devices 157A, 157B, 167A and 167B and home network devices such as home gateway 161, set-top boxes (STBs) 162A, and 162B, television (TV) 163A and TV 163B, home phone 164, router 165, personal computer (PC) 166, smart home or "Internet of Things" (IoT) device 116 (e.g., smart thermostat, smart lighting system, Internet radio intelligent personal assistant, etc.), and so forth, with one another and with various other devices via a core network 110, a wireless access network 150 (e.g., a cellular network), an access network 120, other networks 140 and/or the Internet 145. Mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, and smart home device 116, may also be referred to herein as "customer devices" or "user endpoint devices." As discussed in further detail below, the user endpoint devices may run applications through which customized short-form content can be played (e.g., streamed or downloaded).

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, a portable gaming device, an email device, a computing tablet, a messaging device, a global positioning system (GPS), a satellite radio receiver or satellite television receiver, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, a content generator 115, and a user profile database 180. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may interact with content servers 113 and advertising server 117 to select which video programs, or other content and advertisements to provide to the home network 160 and to others.

In one example, content servers 113 may store scheduled television broadcast content for a number of television channels, video-on-demand programming, local programming content, and so forth. Content servers may also store non-video content, such as podcasts, audio books, electronic books, music, and the like. Content servers 113 may also store content excerpts that are extracted by the content generator 115. Content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160, via the mobile devices 157A, 157B, 167A, and 167B, and at other downstream viewing locations. For example, advertisers may upload various advertising content to the core network 110 to be distributed to various viewers.

In one example, one or more of the application servers 114 may host a social media application, e.g., an Internet-based application via which users can create and share of information. For instance, the social media application may comprise a personal and/or professional social networking application, a blogging or microblogging application, an image or video sharing application, a web feed, or the like. The social media application may maintain a profile for each user of the social media application, which the user can update at any time. The social media application may also allow the user to consume content uploaded by other users and to comment on, rate, or review the content uploaded by the other users.

The user profile database 180 may store a plurality of profiles for users of the network 100 (e.g., customers or subscribers of a telecommunications service provider who manages the network 100). The profiles may include, for each user: unique identifying information for the user (e.g., name, user name, user identifier, etc.), endpoint devices used by the user and means of reaching the endpoint devices (e.g., email address, phone number, IP address, etc.), services to which the user is subscribed (e.g., calling and/or data plans, video and/or audio streaming subscriptions, book subscriptions), social media accounts associated with the user, content interests of the user (e.g., whether explicitly identified by the user or inferred from the user's content consumption history), and/or other data. The profiles may be stored in encrypted form to protect the privacy of the associated users.

In one example, the content generator 115 comprises a server or computing device that has access to the content stored on the TV server(s) 112, content server(s) 113, application server(s) 114, and ad server 117. The content generator may access content from any of these sources and extract excerpts from the content. In one example, the content is long-form content (e.g., any content whose duration is longer than a predefined time period, such as ten minutes), and the excerpts comprise segments (e.g., sequences of frames, sequences of audio frames, phrases, sentences, or the like) of the content whose durations are shorter than the entirety of the content from which the excerpts are extracted. For instance, the durations of the excerpts may be shorter than or equal to the predefined time period. The content generator 115 may also generate short-form content (e.g., content whose duration is less than or equal to the predefined time period) comprising one or more of the excerpts, where the excerpts making up a particular item or short-form content are customized based on the interests of a specific user. The short-form content generated by the content generator 115 may be forwarded to the user endpoint devices (e.g., mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, and smart home device 116) and consumed (e.g., viewed, listened to, or the like) on those user endpoint devices.

Figure 3:
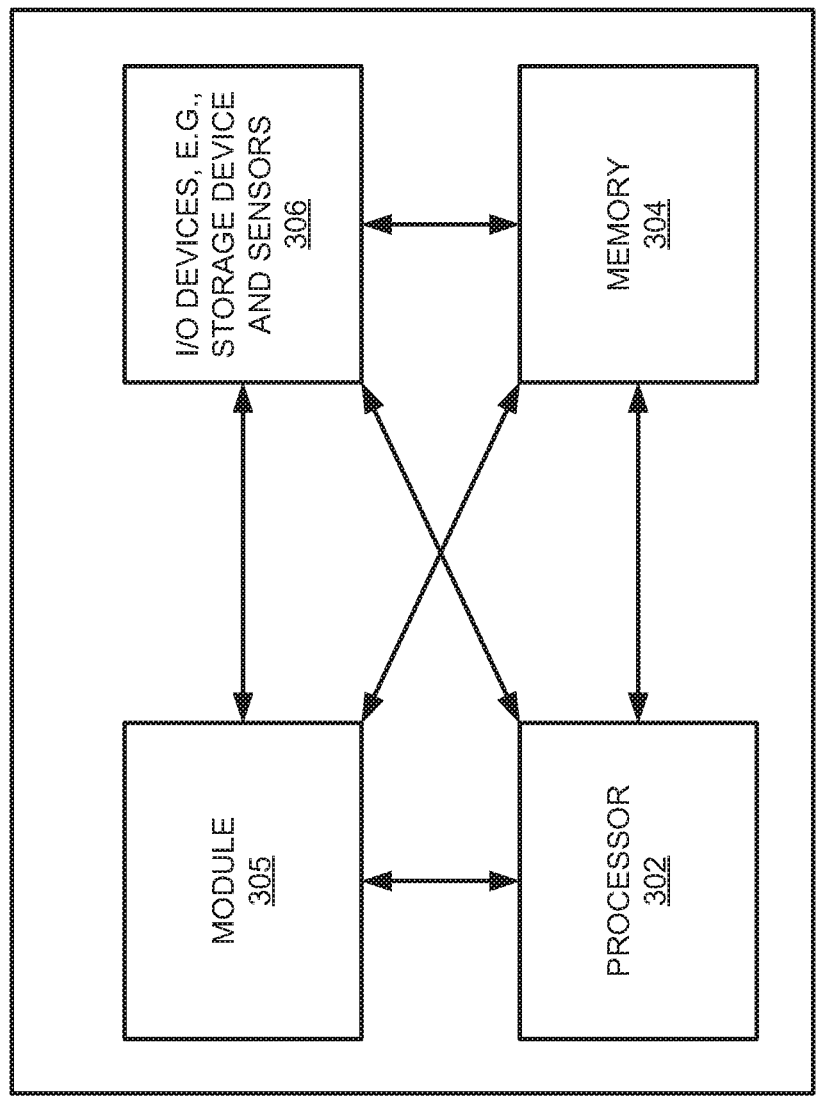
FIG. 3 depicts a high-level block diagram of a computing device specifically programmed to perform the functions described herein.

In one example, any or all of the television servers 112, content servers 113, application servers 114, content generator 115, and advertising server 117 may comprise a computing system, such as computing system 300 depicted in FIG. 3.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data files are forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
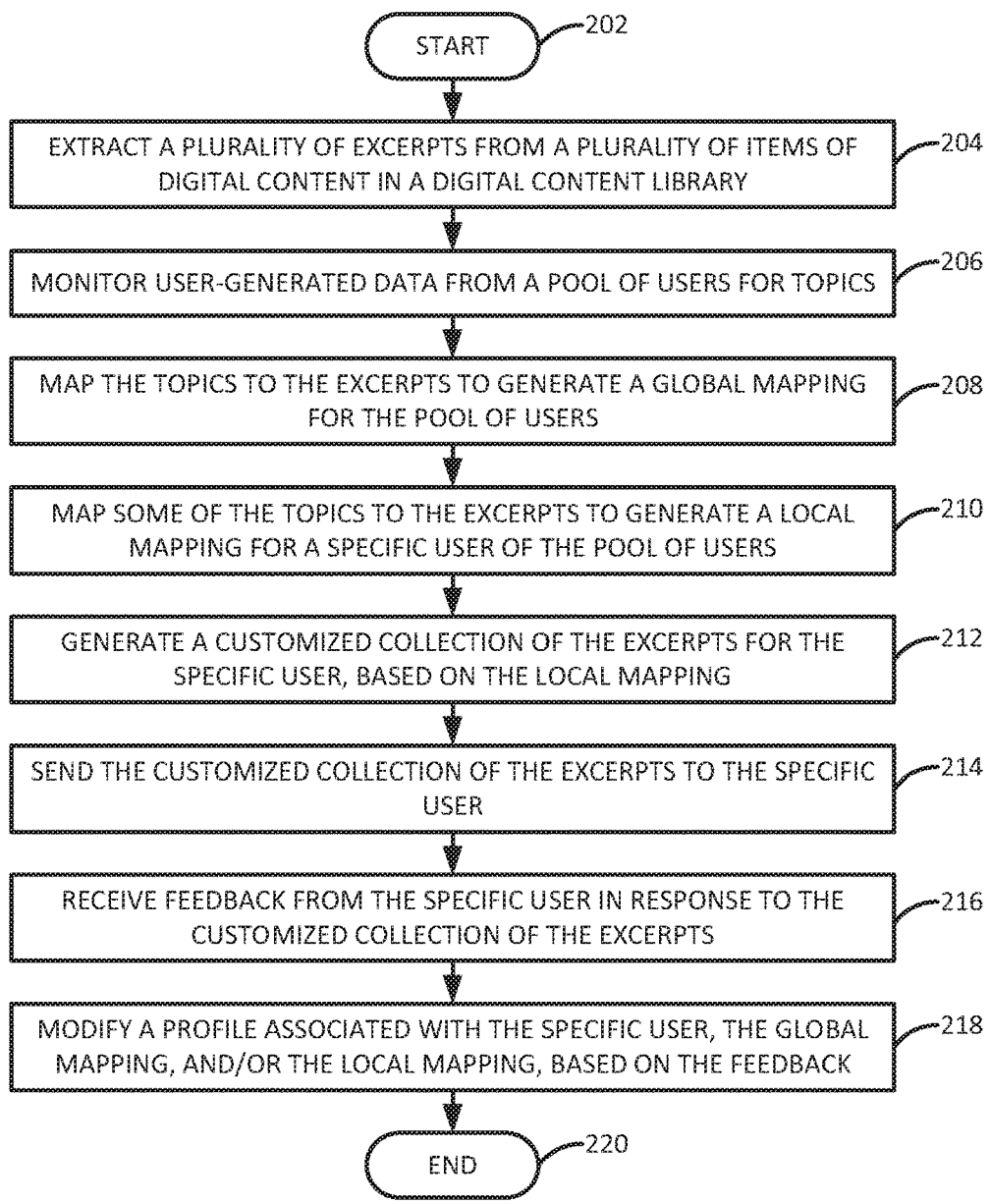
FIG. 2 illustrates a flowchart of an example method for creating customized short-form content from long-form content.

To further aid in understanding the present disclosure, FIG. 2 illustrates a flowchart of an example method 200 for creating customized short-form content from long-form content. In one example, the method 200 may be performed by a server such as the content generator 115 illustrated in FIG. 1 and/or the computing device 300 illustrated in FIG. 3. However, in other examples, the method 200 may be performed by another device. For the sake of example, steps of the method 200 are described as being performed by a processor.

The method 200 begins in step 202. In step 204, the processor may extract a plurality of excerpts from a plurality of items of digital content in a digital content library. The items of digital content may comprise, for example, television shows, movies, sports broadcasts, videos, songs, podcasts, audio books, electronic books, electronic magazines, electronic newspapers, web sites, advertisements, or the like. Thus, the items of digital content could take the form of video files, audio files, text files, and/or another type of file format.

Each excerpt may comprise a portion of an item of digital content, where the duration of the portion is less than the duration of the item of digital content. For example, an excerpt generated from a video may comprise a sequence of frames extracted from the video file. Similarly, an excerpt generated from an audio file may comprise a sequence of audio frames extracted from the audio file. An excerpt generated from text may comprise one or more phrases or sentences extracted from the text file. In one example, multiple excerpts may be extracted from the same item of digital content. Some of the multiple excerpts may overlap or contain common content (e.g., two different excerpts from the same video may share a number of video frames). Moreover, each excerpt may be encoded in a plurality of formats (e.g., hypertext transfer protocol live streaming or "HLS," Dynamic Adaptive Streaming over hypertext transfer protocol or "DASH", or the like) and/or bitrates (96 kilobytes per second, 128 kilobytes per second, etc.) to accommodate the capabilities of different user endpoint devices.

In one example, step 204 includes generating a metadata file for each excerpt, where the metadata file may include an identifier for the excerpt, an identification of the item of digital content from which the excerpt was extracted, a duration of the excerpt, a start and end time from the item of digital content that are spanned by the excerpt, a genre of the excerpt, a uniform resource locator (URL) of the excerpt in a database or server, and/or other metadata. Some of this metadata may be obtained from a metadata file associated with the item of digital content from which the excerpt was extracted.

In step 206, the processor may monitor user-generated data for topics. The user-generated data may be generated by a pool of users (e.g., customers or subscribers of a telecommunications service provider). For instance, the processor may monitor user profiles, social media feeds, and other sources to identify trending topics (e.g., topics that a relatively large number of users are talking about or in which a relatively large number of users are otherwise are expressing interest). Trending topics may include, for example, popular television series, upcoming movie or album releases, upcoming events, and the like.

In step 208, the processor may map the topics identified in step 206 to the excerpts extracted in step 204 to generate a global mapping. The global mapping identifies relationships or relevancies between the topics to and specific excerpts. For instance, a topic that relates to a first television show may be mapped to a plurality of excerpts extracted from the most recent episode of the first television show or to a plurality of excerpts extracted from a second television show that shares similarities with the first television show (e.g., a similar viewer base, similar actors or directors, similar themes, etc.). A topic that relates to an upcoming album release may be mapped to a plurality of excerpts of songs appearing on the album. The global mapping is based on topics that have been identified through monitoring of user-generated data for the pool of users. Topics may be mapped to excerpts using metadata (e.g., matching keywords in the topics to metadata associated with the excerpts) or through other means.

In step 210, the processor may map some of the topics identified in step 206 to the excerpts extracted in step 204 to generate a local mapping for a specific user of the pool of users. Thus, the operations performed in step 210 are similar to the operations performed in step 208, except that the operations are performed for a specific user. Thus, the topics associated with the specific user may comprise only a subset of the topics associated with the pool of users. For instance, the topics associated with the specific user may indicate that the user has not expressed an interest in an upcoming album release, but that the user regularly watches a popular television show. Thus, the local mapping may indicate excerpts that are related in some way to topics associated with the specific user.

In step 212, the processor may generate a customized collection of excerpts for the specific user, based on the local mapping. For instance, the processor may generate a file that comprises one or more of the excerpts mapped to the topics of the local mapping, presented in a dynamic linear feed. Thus, the customized collection of excerpts may be presented as a personalized channel. As an example, if the local mapping indicated that the specific user regularly watches a popular television show, the processor may generate a file that presents several video excerpts from the most recent episode of the television show in some sort of sequence. In one example, the customized collection of excerpts may be generated on-demand, e.g., in response to an explicit user request (e.g., indicated by the specific user logging into an application, sending a request for customized content, or the like).

In step 214, the processor may send the customized collection of excerpts to the specific user. For instance, upon the user logging into an application on a user endpoint device, the customized collection of excerpts could be pushed in streaming format to the application. A plurality of customized collections of excerpts could be presented for selection by the specific user in this case. For instance, a first customized collection of excerpts could contain excerpts related to topics that are trending in the specific user's social media feeds. A second customized collection of excerpts could contain excerpts related to media the specific user has missed over a period of time (e.g., the last week). A third customized collection of excerpts could contain excerpts related to content the specific user has consumed in the past (e.g., "Because you watched X, you may like Y."). The plurality of customized collections of excerpts could be presented in a carousel fashion. Alternatively, a hyperlink to the customized collection of excerpts could be sent to the user endpoint device (e.g., via email, text message, or the like).

In step 216, the processor may receive feedback from the specific user in response to the customized collection of excerpts. For instance, the specific user may indicate that he or she enjoyed or did not enjoy particular excerpts in the customized collection of excerpts. Thus, the feedback for a particular excerpt could be expressed in the form of a binary indicator (e.g., thumbs up or thumbs down), a numerical score falling along a defined range of scores (e.g., one to ten), open-ended feedback (e.g., free-form user statements such as "I liked this clip" or "Do not show me any more clips from this show"), or in other forms. User feedback could also be expressed implicitly (e.g., through the number of times the specific user played a particular excerpt, whether the specific user took any action, such as purchase of media content, after playing a particular excerpt, and/or other metrics).

In step 218, the processor may modify at least one of the user profile associated with the specific user, the global mapping, or the local mapping for the specific user, based on the user feedback received in step 216. For instance, if the user feedback included a request to not show the specific user excerpts from a particular television show, the local mapping may be modified to remove mappings to excerpts that are extracted from the particular television show. Thus, the customized collection of excerpts that are generated for the specific user in the future may be better tailored to the specific user's interests.

The method 200 may end in step 220.

Moreover, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure. For instance, some steps of the method 200 could be performed simultaneously. As an example, step 204 could be performed simultaneously with step 206.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a server (such as the content generator 115 of FIG. 1) could be implemented as illustrated in FIG. 3.

As depicted in FIG. 3, the system 300 comprises a hardware processor element 302, a memory 304, a module 305 for creating customized short-form content from long-form content, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for creating customized short-form content from long-form content may include circuitry and/or logic for performing special purpose functions relating to creating customized collections of media content excerpts. The input/output devices 306 may include, for example, a camera, a video camera, storage devices (including but not limited to, a tape drive, a floppy drive, a hard disk drive or a compact disk drive), a receiver, a transmitter, a display, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s)

discussed above can be used to configure a hardware processor to perform the steps, functions and/or operations of the above disclosed method(s). In one example, instructions and data for the present module or process 305 for creating customized short-form content from long-form content (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for making creating customized short-form content from long-form content (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
    extracting, by a processing system including at least one processor, a first excerpt from a first item of digital content, wherein the first item of digital content is one of a plurality of items of digital content stored in a digital content library of a telecommunications service provider network, and wherein the first excerpt is one of a plurality of excerpts extracted from the plurality of items of digital content;
    identifying, by the processing system, a plurality of topics that are trending among a plurality of users of the telecommunications service provider network;
    identifying, by the processing system based on a profile of a first user of the plurality of users, a subset of the plurality of topics in which the first user has expressed an interest, wherein the subset contains less than all of the plurality of topics;
    mapping, by the processing system, the first excerpt to a first topic of the subset to generate a local mapping that is specific to the first user, wherein the local mapping indicates a respective relationship between each topic of the subset and an excerpt of the plurality of excerpts;
    generating, by the processing system, a customized collection of the plurality of excerpts for the first user based on the local mapping, wherein the first excerpt is included in the customized collection of the plurality of excerpts; and
    sending, by the processing system, the customized collection of the plurality of excerpts to the first user.

2. The method of claim 1, wherein a duration of the first excerpt is shorter than a duration of the first item of digital content.

3. The method of claim 1, wherein the first item of digital content comprises a video file.

4. The method of claim 1, wherein the first item of digital content comprises an audio file.

5. The method of claim 1, wherein the first item of digital content comprises a text file.

6. The method of claim 1, further comprising:
    subsequent to the extracting and prior to the mapping, generating a metadata file for the first excerpt, wherein the metadata file identifies at least a genre of the first excerpt.

7. The method of claim 6, wherein the mapping comprises:
    matching a keyword associated with the first topic to metadata in the metadata file.

8. The method of claim 1, wherein the plurality of topics is identified by monitoring data generated by the plurality of users.

9. The method of claim 8, wherein the data generated by the plurality of users includes a plurality of profiles, and wherein each profile of the plurality of profiles is associated with one user of the plurality of users.

10. The method of claim 8, wherein the data generated by the plurality of users includes a plurality of social media feeds associated with the plurality of users.

11. The method of claim 1, wherein the customized collection of the plurality of excerpts is presented as a dynamic linear feed.

12. The method of claim 1, wherein the generating and the sending are performed in response to a request from the first user.

13. The method of claim 1, further comprising:
    receiving feedback from the first user in response to the sending; and
    modifying the local mapping in response to the feedback.

14. The method of claim 13, wherein the feedback comprises an explicit indication from the first user that indicates whether the first user enjoyed the first excerpt.

15. The method of claim 13, wherein the feedback comprises an action taken by the first user in response to the first user playing the customized collection of the plurality of excerpts.

16. The method of claim 15, where the action comprises the first user re-playing the first excerpt.

17. The method of claim 15, where the action comprises the first user making a purchase of the first item of digital content.

18. The method of claim 1, further comprising:
    mapping the first excerpt to a second topic of the plurality of topics to generate a global mapping for the plurality of users, wherein the global mapping indicates a relationship between the second topic and the first excerpt.

19. A device, comprising:
    a processor; and
    a non-transitory computer-readable medium storing instructions which, when executed by the processor, cause the processor to perform operations, the operations comprising:
        extracting a first excerpt from a first item of digital content, wherein the first item of digital content is one of a plurality of items of digital content stored in a digital content library of a telecommunications service provider network, and wherein the first excerpt is one of a plurality of excerpts extracted from the plurality of items of digital content;
identifying a plurality of topics that are trending among a plurality of users of the telecommunications service provider network;
identifying, based on a profile of a first user of the plurality of users, a subset of the plurality of topics in which the first user has expressed an interest, wherein the subset contains less than all of the plurality of topics;
mapping the first excerpt to a first topic of the subset to generate a local mapping that is specific to the first user, wherein the local mapping indicates a respective relationship between each topic of the subset and an excerpt of the plurality of excerpts;
generating a customized collection of the plurality of excerpts for the first user based on the local mapping, wherein the first excerpt is included in the customized collection of the plurality of excerpts; and
sending the customized collection of the plurality of excerpts to the first user.

20. A non-transitory computer-readable medium storing instructions which, when executed by a processor, cause the processor to perform operations, the operations comprising:
extracting a first excerpt from a first item of digital content, wherein the first item of digital content is one of a plurality of items of digital content stored in a digital content library of a telecommunications service provider network, and wherein the first excerpt is one of a plurality of excerpts extracted from the plurality of items of digital content;
identifying a plurality of topics that are trending among a plurality of users of the telecommunications service provider network;
identifying, based on a profile of a first user of the plurality of users, a subset of the plurality of topics in which the first user has expressed an interest, wherein the subset contains less than all of the plurality of topics;
mapping the first excerpt to a first topic of the subset to generate a local mapping that is specific to the first user, wherein the local mapping indicates a respective relationship between each topic of the subset and an excerpt of the plurality of excerpts;
generating a customized collection of the plurality of excerpts for the first user based on the local mapping, wherein the first excerpt is included in the customized collection of the plurality of excerpts; and
sending the customized collection of the plurality of excerpts to the first user.

* * * * *